(12) United States Patent
Salzinger et al.

(10) Patent No.: US 11,619,358 B2
(45) Date of Patent: Apr. 4, 2023

(54) PORTABLE SOLAR LIGHTING DEVICES

(71) Applicant: MPOWERD Inc., Brooklyn, NY (US)

(72) Inventors: John Salzinger, Brooklyn, NY (US); Mehmet Mailmail, New York, NY (US); Seungah Jeong, Brooklyn, NY (US); Suzanne Chang, Bayside, NJ (US)

(73) Assignee: MPOWERD Inc., Brooklyn, NY (US)

( * ) Notice: Subject to any disclaimer, the term of this patent is extended or adjusted under 35 U.S.C. 154(b) by 0 days.

(21) Appl. No.: 16/575,931

(22) Filed: Sep. 19, 2019

(65) Prior Publication Data

US 2020/0088361 A1 Mar. 19, 2020

Related U.S. Application Data

(60) Provisional application No. 62/733,369, filed on Sep. 19, 2018, provisional application No. 62/743,803, filed on Oct. 10, 2018.

(51) Int. Cl.
*F21L 4/08* (2006.01)
*F21V 21/096* (2006.01)
*F21L 2/00* (2006.01)
*F21L 4/02* (2006.01)
*F21Y 115/10* (2016.01)

(52) U.S. Cl.
CPC ............... *F21L 4/08* (2013.01); *F21L 2/00* (2013.01); *F21L 4/02* (2013.01); *F21V 21/0965* (2013.01); *F21Y 2115/10* (2016.08)

(58) Field of Classification Search
CPC ................................................. F21V 21/0965
See application file for complete search history.

(56) References Cited

U.S. PATENT DOCUMENTS

| | | | |
|---|---|---|---|
| 7,021,787 B1* | 4/2006 | Kuelbs | A45B 3/04 362/183 |
| 10,344,924 B1* | 7/2019 | Ganahl | F21V 15/04 |
| 10,674,619 B1* | 6/2020 | Heffner | H05K 5/0256 |
| 2007/0247858 A1* | 10/2007 | Ford | F21V 21/088 362/382 |
| 2009/0268436 A1* | 10/2009 | Taiga | F21V 23/0414 362/158 |
| 2011/0255274 A1* | 10/2011 | Coleman | F21V 21/30 362/183 |
| 2012/0057349 A1* | 3/2012 | Loraing | F21V 23/06 362/249.02 |
| 2013/0163234 A1* | 6/2013 | Hsien | F21V 21/005 362/190 |

(Continued)

*Primary Examiner* — Oluseye Iwarere
*Assistant Examiner* — Michael Chiang
(74) *Attorney, Agent, or Firm* — Pearl Cohen Zedek Latzer Baratz LLP

(57) ABSTRACT

Lighting devices and sets comprising multiple lighting devices are described. The lighting device may include a housing, at least one light source such as a light-emitting diode (LED), a rechargeable battery, optionally a microprocessor, and at least one solar panel. The lighting device may include a mount configured to secure the lighting device to a support, such as a frame or other portion of a vehicle or other device. The set of lighting devices may include first and second lighting devices, each including a light source, optionally wherein the light sources may emit different colors of light.

8 Claims, 6 Drawing Sheets

(56) References Cited

U.S. PATENT DOCUMENTS

| | | | |
|---|---|---|---|
| 2013/0163235 A1* | 6/2013 | Chuang | F21V 15/01 |
| | | | 362/190 |
| 2014/0098524 A1* | 4/2014 | Liao | B62J 6/02 |
| | | | 362/183 |
| 2016/0327233 A1* | 11/2016 | Wei | F21S 9/037 |
| 2017/0130941 A1* | 5/2017 | Ford | F21S 2/005 |
| 2017/0367153 A1* | 12/2017 | Rooymans | H02J 3/386 |
| 2018/0058671 A1* | 3/2018 | Cramer | F21V 17/105 |
| 2018/0102655 A1* | 4/2018 | Miller | H05B 47/16 |
| 2018/0274768 A1* | 9/2018 | Grider | F21V 23/005 |
| 2019/0032867 A1* | 1/2019 | Flesch | H02J 7/0047 |

* cited by examiner

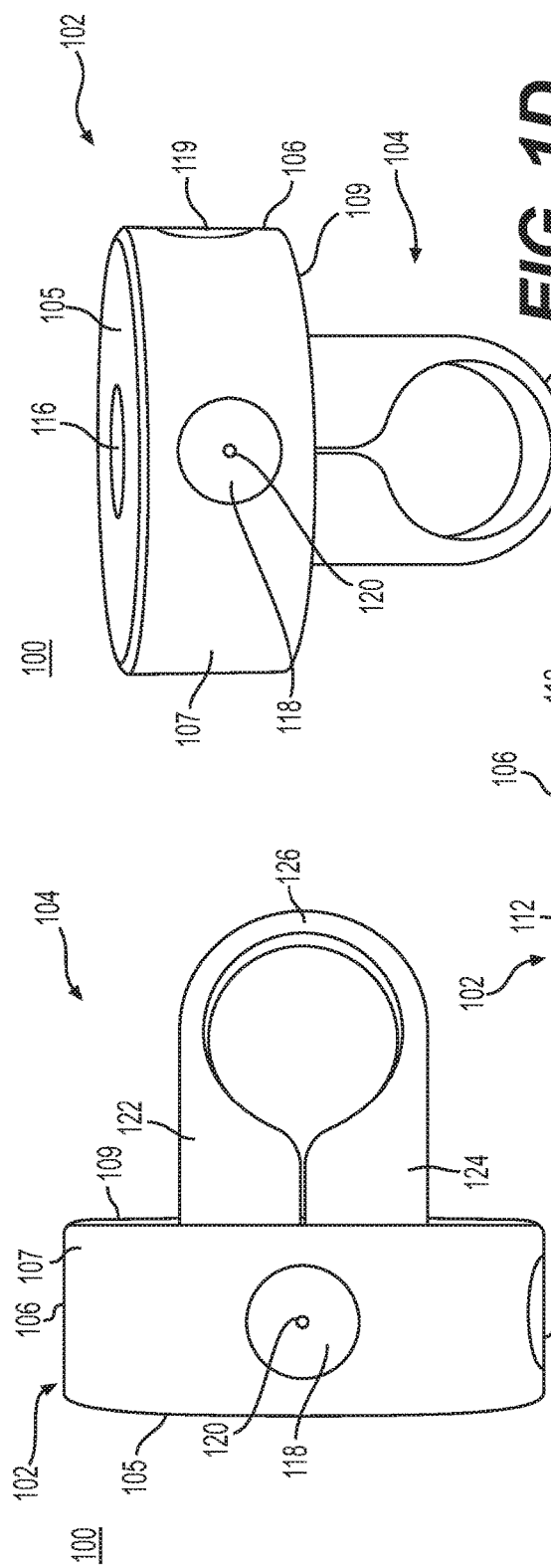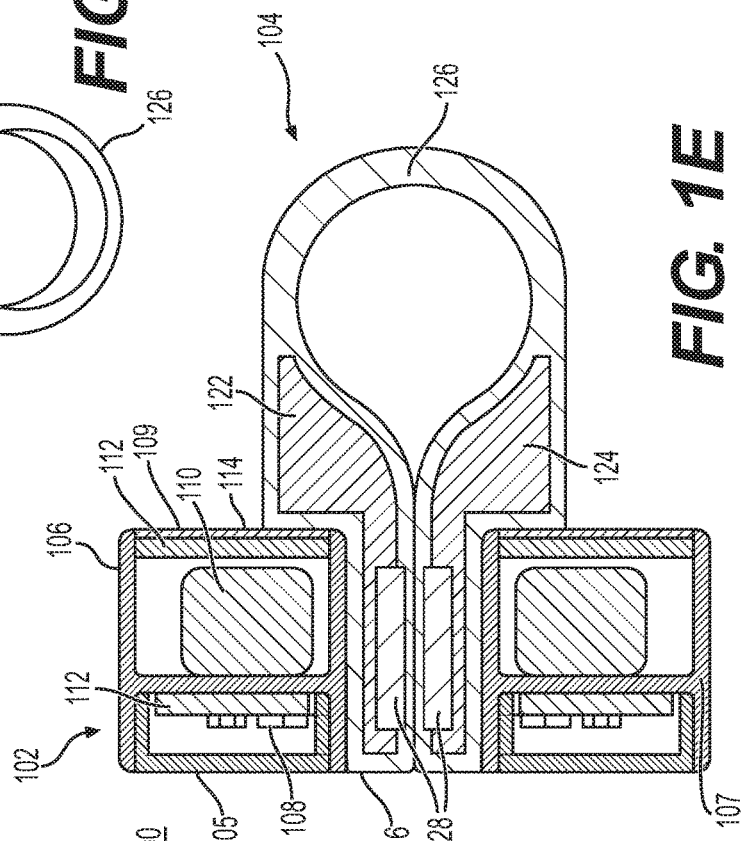

PORTABLE SOLAR LIGHTING DEVICES

CROSS-REFERENCE TO RELATED APPLICATIONS

This application claims priority to U.S. Provisional Application No. 62/733,369 filed on Sep. 19, 2018, and U.S. Provisional Application No. 62/743,803 filed on Oct. 10, 2018, each of which is incorporated herein by reference in its entirety.

TECHNICAL FIELD

The present disclosure generally relates to lighting devices. More particularly, embodiments of the present disclosure include portable, rechargeable solar-powered lighting devices, such as lighting devices for bicycles, scooters, and other vehicles and devices.

BACKGROUND

Certain situations require alternative lighting solutions, such as during limited or interrupted power access, or a lack of power altogether. Examples include cases of natural disaster and other emergencies, remote/rural locations far from a power station or electricity grid, and developing countries that have limited and/or unreliable power. Yet, current lighting options are often short-lived, unreliable, inefficient, non-reusable/non-rechargeable, impractical, and/or expensive to produce and operate.

SUMMARY OF THE DISCLOSURE

The present disclosure includes lighting devices and related kits and uses thereof. For example, the lighting device may comprise a base including a housing, at least one light source, a rechargeable battery, a microprocessor, and at least one solar panel, wherein the base defines a hole extending from a first end to a second end of the housing; and a handle including a top portion and a bottom portion, wherein a combined cross-sectional dimension of the top and bottom portions correspond to a cross-sectional dimension of the hole, such that the handle is insertable into the hole, the top portion and the bottom portion being configured to flex towards each other to form a friction fit into the hole. According to some aspects of the present disclosure, each of the top portion and the bottom portion of the handle includes a magnet. Further, for example, the top portion may be connected to the bottom portion in a curved section that defines an aperture. The base of the lighting device may have a cylindrical shape, e.g., including a front wall and a back wall opposite the front wall. The solar panel may be coupled to the back wall, for example.

The light source(s) may include a plurality of light-emitting diodes (LEDs) facing the front wall, wherein the front wall is at least partially transparent or translucent to allow light generated by the LEDs to pass therethrough. The plurality of LEDs may be arranged at regular intervals from each other, such as in an annular configuration. In some examples, the microprocessor of the lighting device controls a plurality of operating modes of the base, the plurality of operating modes including changing an intensity of light emitted by the light source(s), e.g., LEDs.

Further, the lighting device may be included in a set of lighting devices. For example, a set of lighting devices according to the present disclosure may include the lighting device described above and elsewhere herein, wherein the lighting device is a first lighting device and the base is a first base, the set of lighting devices further comprising a second lighting device. The second lighting device may comprise a second base including a housing, at least one light source, a rechargeable battery, a microprocessor, and at least one solar panel, wherein the second base defines a hole having the same dimensions as the hole defined by the first base, wherein the at least one light source of the first base and the at least one light source of the second base generate different colors of light.

The present disclosure also includes a lighting device comprising a housing including a front wall, a back wall, and at least one side wall between the front wall and the back wall; at least one light source facing towards the front wall; a rechargeable battery in electronic communication with the light source; at least one solar panel coupled to the at least one side wall of the housing; the solar panel being in electronic communication with the light source and the rechargeable battery; at least one magnet coupled to or proximate the back wall; and a mount coupled to or integrated into the housing, the mount being configured to secure the lighting device to a support, such as a vehicle frame, e.g., a bicycle frame. The mount optionally may be configured as a handle that includes at least one flexible strap. The housing may include a plurality of side walls, wherein the mount is coupled to or integrated into a side wall different than the side wall to which the solar panel is coupled. The housing may, for example, include four side walls, wherein the solar panel is coupled to a side wall opposite the side wall that includes the mount.

The lighting device of the preceding paragraph (discussed elsewhere herein) may be included in a set of lighting devices. For example, the lighting device may be a first lighting device, wherein the set includes a second lighting device comprising a housing including a front wall, a back wall, and at least one side wall between the front wall and the back wall; at least one light source facing towards the front wall; a rechargeable battery in electronic communication with the light source; and at least one magnet coupled to or proximate the back wall. The magnet of the first lighting device may be complementary to the magnet of the second lighting device, such that the back wall of the first lighting device is releasably attachable to the back wall of the second lighting device by magnetic attraction. In at least one example, the second lighting device does not include a solar panel. Further, according to some aspects of the present disclosure, the first lighting device is configured to charge the rechargeable battery of the second lighting device when the first and second lighting devices are coupled together. Additionally or alternatively, the mount of the first lighting device may be a first mount, the set of lighting devices further comprising a second mount that includes at least one magnet, the second mount being releasably attachable to the back wall of the second lighting device by magnetic attraction.

The present disclosure also includes a set of lighting devices comprising (a) a first lighting device that includes a housing a housing including a front wall, a back wall, and a plurality of side walls between the front wall and the back wall; at least one light-emitting diode (LED) facing towards the front wall; a rechargeable battery in electronic communication with the light source; at least one solar panel coupled to a side wall of the plurality of side walls of the housing; the solar panel being in electronic communication with the light source and the rechargeable battery; and at least one magnet coupled to or proximate the back wall; and (b) a second lighting device that includes: a housing including a front wall, a back wall, and a plurality of side walls between the front wall and the back wall; at least one LED facing towards the front wall; a rechargeable battery in electronic communication with the light source; and at least one magnet coupled to or proximate the back wall; wherein the magnet of the first lighting device is complementary to the magnet of the second lighting device, such that the first lighting device is releasably attachable to the second lighting device by magnetic attraction. According to some aspects, the set of lighting devices further comprises at least one mount configured to secure the first lighting device or the second lighting device to a support. Further, for example, the housing of each of the first lighting device and the second lighting device may be rectangular in shape. The LED(s) of the first lighting device and the LED(s) of the second lighting device may generate different colors of light. In at last one example, the first lighting device further comprises a microprocessor that controls a plurality of operating modes of the first lighting device, the plurality of operating modes including changing an intensity of light emitted by the LED(s) of the first lighting device.

It is to be understood that both the foregoing general description and the following detailed description are exemplary and explanatory only and are not restrictive of the disclosed embodiments, as claimed.

BRIEF DESCRIPTION OF THE FIGURES

The accompanying drawings, which are incorporated in and constitute a part of this specification, illustrate various exemplary embodiments and together with the description, serve to explain the principles of the disclosed embodiments.

FIGS. 1C and 1D show side views of the exemplary lighting device of FIG. 1A.

FIG. 1E shows a cross-sectional view of the exemplary lighting device of FIG. 1A.

DETAILED DESCRIPTION

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. As used herein, the terms "approximately" and "about" generally should be understood to encompass ±5% of a stated amount or value.

The present disclosure may include portable solar-powered lighting devices, which may be provided as a set of lights, e.g., a kit or system. The lighting devices disclosed herein may be used, for example, with a bicycle or other vehicles (such as, e.g., trailer, scooter, cart, go-kart, wagon, etc.), or with other devices, including stationary devices and systems, to allow a user to see and/or be seen by others. The lighting devices may be rechargeable.

In some embodiments, the lighting devices may be provided as a set of two devices configured to emit different colors and/or different light patterns. For example, a first lighting device may generate white light (e.g., via one or more white LEDs), and the second lighting device may generate colored light (e.g., red or other color of light via one or more RGB LEDs, or a colored filter over white LED(s)). Thus, for example, the first lighting device may be useful as a headlight, and the second lighting device may be useful as a rear light or tail light, similar to a brake light, or as a second light to allow the vehicle to see and be seen.

Figure 1B:
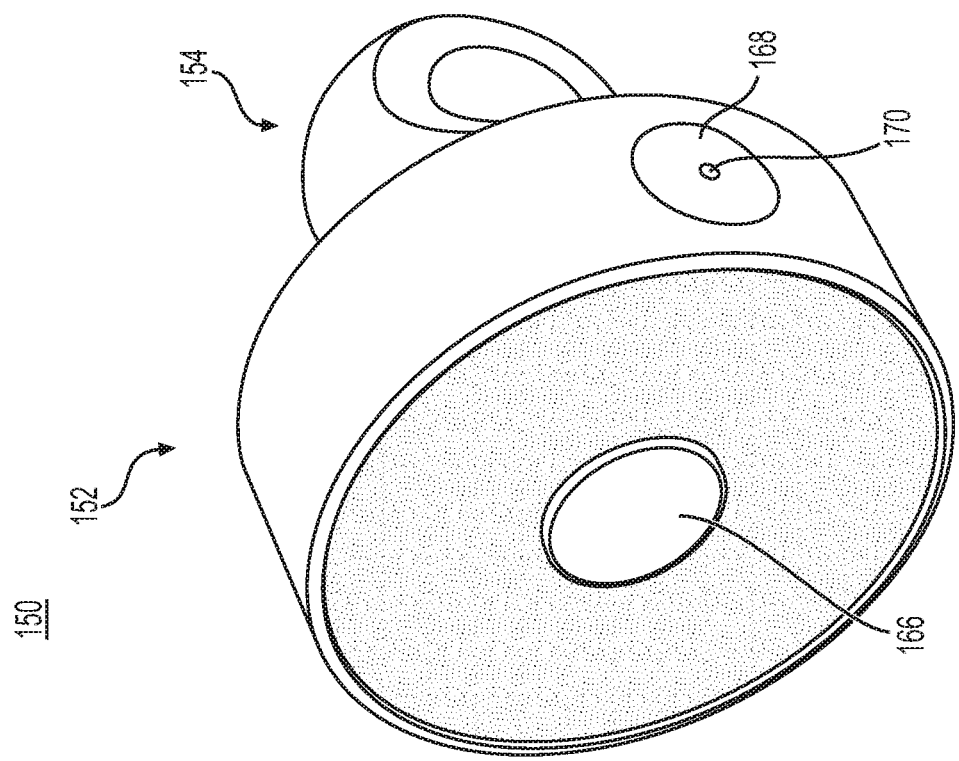
FIGS. 1A and 1B show perspective views of exemplary lighting devices, in accordance with some aspects of the present disclosure.
Figure 1A:
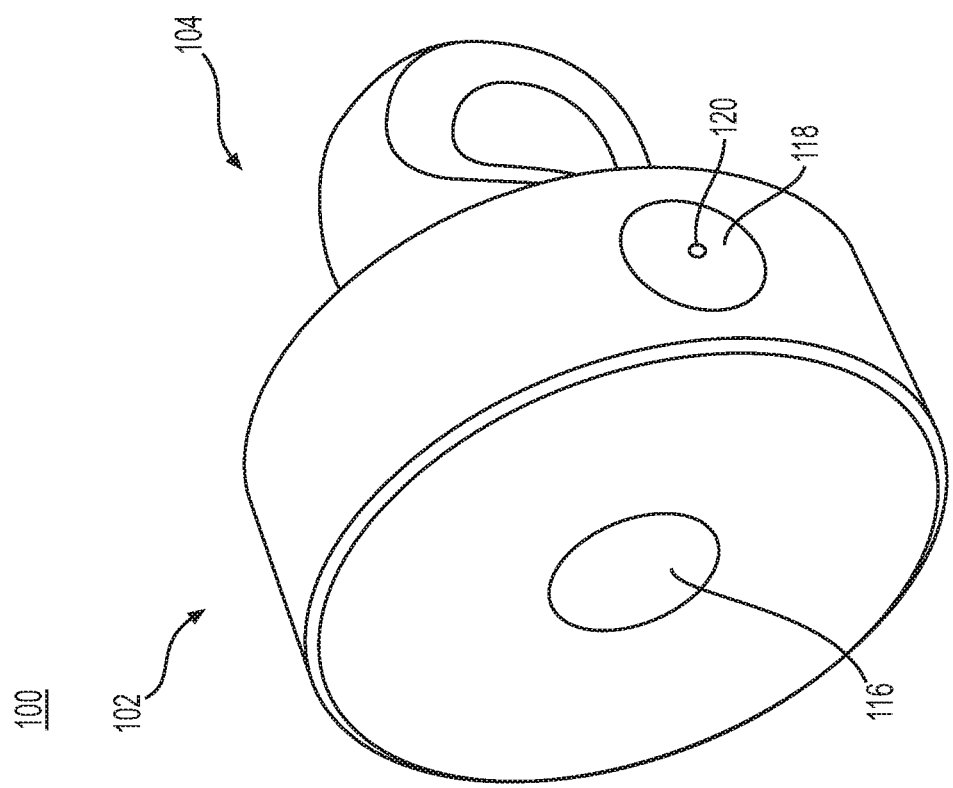

FIGS. 1A and 1B illustrate two exemplary lighting devices (first lighting device 100 and second lighting device 150) which may be provided as a set or kit. The lighting devices 100, 150 may include the same or similar features. For example, each lighting device 100, 150 may include a base 102, 152 and a handle 104, 154 configured to be inserted into a hole 116, 166 of the respective base 102, 152. The base 102, 152 may include a housing, one or more light sources, and one or more solar panels, which may be disposed on a side of the base 102, 152, opposite the light source(s). Further, for example, each device 100, 150 may include a user element or interface, such as a power button 118, 168, for controlling the light source(s), and optionally a power indicator 120, 170 to indicate when the respective device 100, 150 is turned on and/or how much power remains. Each lighting device 100, 150 may be configured to emit light, optionally with a flashlight or spotlight effect. For simplicity, FIGS. 1C-1H refer to features of the first lighting device 100, however, it is understood that the second lighting device 150 may include all or some of the same features.

The base 102 includes a housing 106, which may have a generally cylindrical shape as illustrated in FIGS. 1A-1D, wherein the base 102 may define an aperture or hole 116 configured to receive the handle 104. For example, the housing 106 may be generally annular in shape or otherwise have a puck-like or donut-like structure. The housing 106 may include a first wall 105, a generally cylindrical side wall 107, and a back wall 109. In some examples, each of the front wall 105 and the back wall 109 may have a circular cross-section. The housing 106 may have any other suitable shape, such as oval or polygonal (e.g., square, rectangular, triangular, hexagonal, octagonal, etc.). The front wall 105 and the back wall 109 may have the same size, or may have different sizes. For example, the front wall 105 may be larger than the back wall 109, such that the housing 106 is tapered and wider towards the front end, or the back wall 109 may be larger than the front wall 105, such that the housing 106 is tapered and wider towards the back end.

Exemplary materials suitable for the base 102 and the handle 104 include, but are not limited to, plastics, e.g., polyvinylchloride (PVC), polyethylene (PE), acrylonitrile butadiene styrene (ABS), thermoplastic polyurethane (TPU), and other polymers such as silicone, and combinations of such materials. At least a portion of the housing 106 may be transparent or translucent so as to allow light to generated by the light source(s) 108 (see FIG. 1F) to pass therethrough. For example, the front wall 105 may comprise a clear or frosted plastic material. The front wall 105 may comprise a transparent or translucent material to allow the emitted light to pass therethrough. In some examples, the front wall 105 comprises PVC, TPU, or ABS. The front wall 105 may be configured to the affect the quality, hue, intensity, and/or amount of light that passes therethrough. According to some aspects of the present disclosure, the front wall 105 may be configured to diffuse light to provide for a frosted effect or a warm, diffused glow. Any of the plastic materials used for the housing 106 may have a shiny or matte finish. In some embodiments, the side wall(s) 107 and/or back wall 109 may direct light emitted within the housing 106 towards the front wall 105 to exit the housing 106. For example, the side wall(s) 107 may comprise an opaque material that at least partially reflects light to exit through the front wall 105.

The housing 106 may include at least one user element or interface configured to receive user input, e.g., for controlling one or more operating modes of the lighting device 100. Exemplary user interfaces include, e.g., buttons, switches, dials, and the like. For example, the housing 106 may include a power button 118 to turn the lighting device 100 on and off (to supply and terminate power to light source(s) contained without the housing 106), and/or to control intensity and/or color of light emitted by the device 100. Further, for example, the housing 106 may include one or more electronic ports 119 as discussed further below.

The power button 118 may include a power indicator 120 to display the remaining amount of power stored in the device 100. The power indicator 120 may include one or more indicator lights, optionally displaying different colors based on different power levels. In some embodiments, the power indicator 120 may indicate the relative (e.g., percentage) and/or absolute amount of power or charge remaining in the device 100. Thus, for example, a red light may indicate low power, a green light may indicate full charge or close to full charge, and a yellow light may indicate an intermediate amount of power. In at least one example, a green color shown by the power indicator 120 may represent the power source is at about 66% to about 100% of its full capacity, a yellow color shown by power indicator 120 may represent the power source is at about 38% to about 65% of its full capacity, and a red color shown by the power indicator 120 may represent the power source is at less than or equal to 37% of full capacity, e.g., 0%-37% of full capacity.

The one or more light sources 108 may include, for example, light-emitting diodes (LEDs). The device 100 may include any number of the light sources, such as one light source, or a plurality of 2, 3, 4, 5, 6, 7, 8, 9, or 10 or more light sources. The light source(s) 108 may be coupled to a circuit board 112 in any suitable arrangement. For example, the housing 106 may contain a plurality of LEDs 108 disposed at regular intervals on a circuit board 112. The light source(s) 108 may be positioned or oriented to emit light generally perpendicular to the circuit board 112, through the front wall 105.

As mentioned above, the lighting devices 100, 150 may generate different colors of light, or they may generate the same color of light. The color of light emitted may be any color, such as green, red, yellow, purple, blue, white, pink, etc. For example, the first lighting device 100 may include one or more white LEDs that generate white light, useful as a headlight, and the second lighting device 150 may include one or more colored (RGB) LEDs that generate one or more colors light other than white light, such as, e.g., red light. In at least one example, one or both lighting devices 100, 150 may include a filter over the LED(s) that affects the color of light generated. For example, the second lighting device 150 may include a red filter to generate red light, useful as a rear light or tail light (e.g., brake light).

The light source(s) 108 may have different operating modes, including e.g., high, medium, and/or low intensity (brightness), different colors (i.e., different wavelengths of light) and/or different frequencies of time during which light is emitted. For example, the light source(s) 108 may have a flashing mode, e.g., turning on and off at regular intervals, e.g., 1 second intervals, repeatedly. Other operating modes may include generating different colors of light, e.g., alternating between green light and red light. In some embodiments, the light source(s) 108 may be configured to alternate or cycle between different wavelengths of light, such as alternating red, orange, yellow, green, blue, violet, and white light, and may be combined to generate additional hues of light, such as magenta, cyan, and amber.

The lighting devices herein may include one or more power sources 110, such as a battery, e.g., a rechargeable battery. Exemplary batteries suitable for the device 100 include, but are not limited to, lithium-ion batteries such as a lithium-ion polymer, and lithium iron phosphate batteries. According to some aspects of the present disclosure, the power source(s) 110 may generate a voltage from about 2V to about 5V, such as from about 3V to about 4V, e.g., a voltage of about 3.2V, about 3.5V, or about 3.7V. The power source(s) 110 may have a capacity up to at least 2000 mAh, such as a capacity of about 500 mAh, about 750 mAh, about 1000 mAh, about 1250 mAh, about 1500 mAh, about 1750 mAh, or about 2000 mAh. The power source(s) 110 may be configured to store energy generated by the solar panel(s) 114 (see FIGS. 1E, 1G, and 1H).

The circuit board 112, e.g., printed circuit board (PCB), may be in electronic communication with one or more electronic components of the lighting device 100. For example, the circuit board 112 may include a microprocessor configured to control the device 100 in different operating modes. The microprocessor may be configured to turn the device 100 on or off, dim one or more light sources 108, and/or turn various light sources 108 on or off to achieve a particular color or effect. The solar panel(s) 114 may be coupled to the back wall 109 of the housing 106, e.g., allowing exposure of the solar panel(s) to natural or artificial light. Any suitable solar panel 114 may be used in the device 100. In some embodiments, the one or more solar panels 114 may comprise silicon, e.g., monocrystalline or polycrystalline silicon, optionally backed by a support material, such as polycarbonate or other plastic or polymer. Exemplary voltages of the solar panel(s) 114 may generally range from about 4V to about 8V, e.g., about 5V, about 6V, or about 7V, but other voltages may be encompassed by the disclosure herein. The solar panel(s) 114 may comprise an array or multiple arrays of solar cells 114 in electronic communication with each other.

The solar panel(s) 114, power source(s) 110, microprocessor, light source(s) 108, electronic port(s) 119, and power button 118 may be in communication with one another via the circuit board 112 for operating and controlling the lighting device 100. Thus, a rechargeable battery may serve as the power source 110 and may be recharged from power generated by the solar panel(s) 114 and/or via power supplied by an external electronic device through the electronic port(s) 119.

According to some aspects of the present disclosure, the lighting device 100 may include surge protection, e.g., to protect against voltage spikes, and/or may include a current regulator, e.g., to maintain a desired output of light. For example, a surge protector and/or current regulator may be coupled to the circuit board 112 and in communication with the power source(s) 110. In some embodiments, the device 100 may include a field-effect transistor (FET) to maintain a substantially constant current over time, e.g., as the one or more power sources drain of power, to maintain consistent light output from the device 100.

The handle 104 may include a top portion 122, a bottom portion 124, and a section 126 connecting the top and bottom portions 122, 124. For example, the section may take the form of a loop 126. The materials for forming the handle 104 may include plastics such as ABS, PVC, PE, TPU, or other polymers. The top portion 122 and the bottom portion 124 may have the same design, shape, or material. In some embodiments, the top portion 122 and the bottom portion 124 may have different designs, shapes, or materials. Each of the top portion 122 and the bottom portion 124 may include one or more magnets 128 configured to secure the top portion 122 and the bottom portion 124 together. In at least one example, the top portion 122 and the bottom portion 124 may be formed of a rigid material, such as hard/rigid ABS. In some embodiments, the top portion 122 and the bottom portion 124 may include one or more rigid materials (e.g., ABS) covered with one or more flexible materials (e.g., silicone or rubber). The section 126 may have a curved shape (e.g., shown in FIGS. 1C-1E), or may have any suitable shape or structure to connect the top portion 122 and the bottom portion 124. The section 126 optionally may define an aperture, such as a circular aperture, wherein the cross-sectional dimension (e.g., diameter) of the aperture may range from about 1 cm to about 5 cm or more, e.g., about 2 cm, about 3 cm, or about 4 cm.

The top portion 122 and the bottom portion 124 may be configured to flex towards and away from each other via the loop 126 (or other configuration of connecting section), such that the handle 104 can wrap around a support (e.g., a frame) to secure the handle 104 to a bicycle, vehicle, or other device. The loop 126 may be formed of or comprise a flexible material, such as silicone. For example, the loop 126 may include silicon overmolded over the top portion 122 and the bottom portion 124, allowing for the handle 104 to be securely fit to different types and sizes of supports. In some embodiments, the top portion 122 or the bottom portion 124 may be connected to the loop 126 via a hinged arrangement (e.g., a living hinge) so the top portion 122 or the bottom portion 124 may be configured to flex towards and away from each other such that the handle 104 can wrap around a support.

The handle 104 may fit in, that is be received by, the hole 116 defined by the housing 106 of the base 102. The combined cross-sectional dimension of the top and bottom portions 122, 124 may correspond to the cross-sectional dimension (e.g., diameter) of the hole, such that the handle is insertable into the hole, e.g., by a friction-fit connection. Further, the handle 104 may be selectively removable from the base 102, such that the handle 104 can be inserted into or received by the hole 116 via the side of the first wall 105 (leaving the back wall 109 exposed) or via the side of the back wall 109 (leaving the front wall 105 exposed). For example, inserting the handle 104 via the side of the first wall 105 may allow for charging of the solar panel(s) 114 on the back wall 109 (e.g., during charging), while inserting the handle 104 via the side of the back wall 109 may allow for the one or more light sources 108 to shine through the front wall 105 (e.g., during use as a light).

Once through the hole 116 (e.g., the hole 116 being locate in the middle of the base 102, or offset from the middle), the handle 104 may be sufficiently secured to the base 102 to withstand different conditions that a user may encounter, such as, e.g., rough road conditions for a cyclist or motorist. The handle 104 may be secured to the base 102 via a snap-fit or a friction-fit connection, Velcro, or other suitable removable connection (e.g., complementary threads, magnets, clips, etc.). The handle 104 may be oriented with respect to the one or more solar panels 114 to minimize its overlap with the one or more solar panels 114. As shown in FIG. 1G, the width or length of the handle 104 may be the same or smaller than the size (e.g., diameter) of the hole 116. In some embodiments, the device 100 does not include a handle.

As mentioned above, the lighting device 100 may be configured to allow for mounting the lighting device 100 to different sizes of bicycles and/or different types of vehicles. For instance, after the handle 104 may wrap around a support (e.g., a portion of the bicycle frame or other vehicle frame) to secure the handle 104 to the vehicle, the base 102 then can be placed over the handle 106, such that the handle 104 is disposed within the hole 116 of the base 102. In another example, a user may remove the handle 104 from the base 102, flexibly separate the top portion 122 and the bottom portion 124 of the handle 104, wrap/mount the handle 104 around a vehicle component (e.g. bicycle frame), and then hold the top portion 122 and the bottom portion 124 of the handle 104 together to push the base 102 over the handle 104. In yet another example, a user may also remove the device 100 from the vehicle by first separating the base 102 from the handle 104 and then separating the portion 122 and the bottom portion 124 of the handle 104. Depending on the charge or use scenario, the user may put the side of the front wall 105 or the side of the back wall 109 facing outward (or facing up) away from the vehicle. In some examples, the handle 104 may be compatible with different bases. For example, a user may use different combinations of handles and bases in order to attach to different types of supports and/or to provide for different handle/base configurations.

Figure 1F:
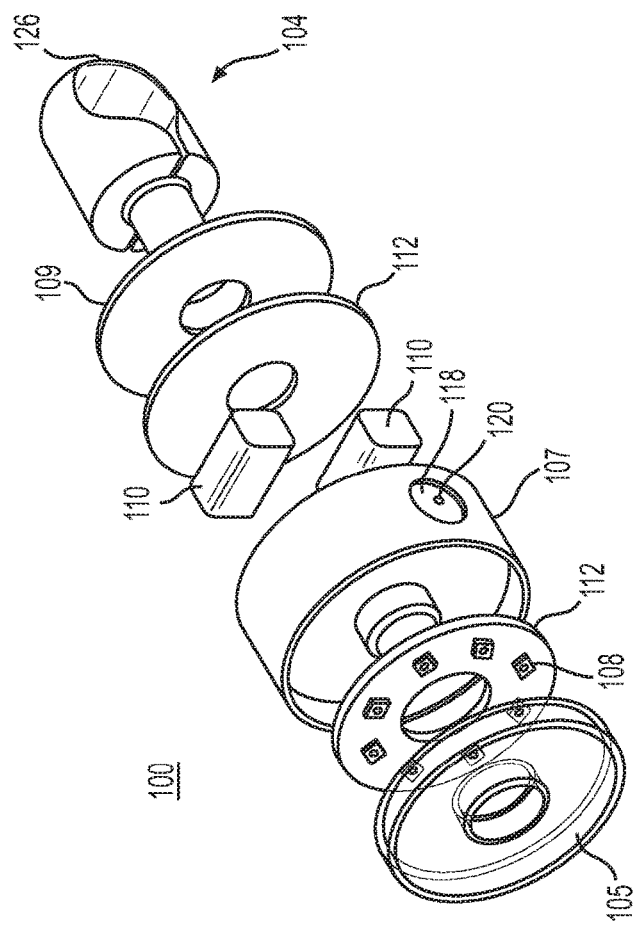
FIG. 1F shows an exploded view of the exemplary lighting device of FIG. 1A.
Figure 1H:
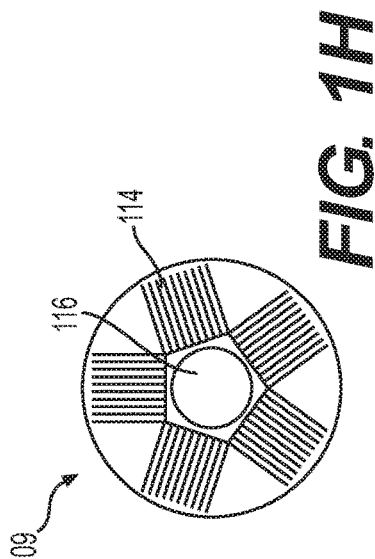
FIG. 1H shows a solar panel of the exemplary lighting device of FIG. 1A.
Figure 1G:
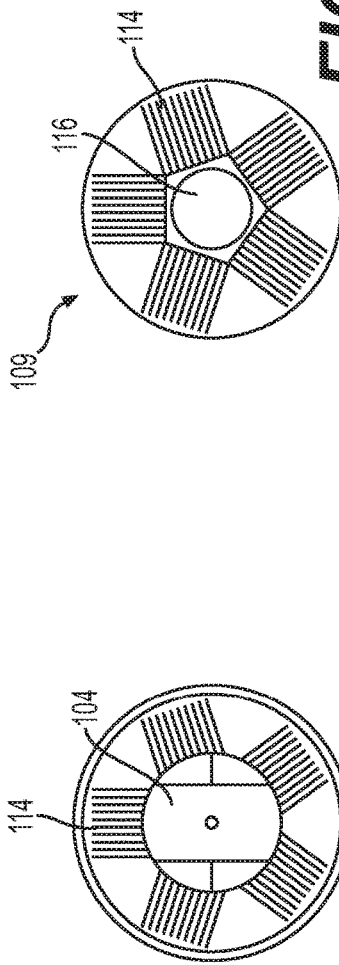
FIG. 1G shows a back view of the exemplary lighting device of FIG. 1A.

FIG. 1F shows an exploded view of the device 100, showing components of the base 102 and the handle 104, including the light source(s) 108, the power source(s) 110; the circuit board 112; and the solar panel(s) 114. As mentioned above, the power source(s) 110 may include a rechargeable battery, which may be operably connected to the solar panel(s) 114. For example, the battery 110 may be configured to store energy generated by the solar panel(s) 114. FIG. 1F is exemplary and non-limiting, such that the device 100 may include additional or fewer components than shown.

An exemplary set of such lighting devices is illustrated in FIGS. 2A-2F. For example, the lighting devices herein may be provided as a set of two lights, wherein each light may comprise one or more magnets complementary to one or more magnets of the other light. Thus, for example, the two lighting devices may be selectively attached to each other (e.g., for charging and/or storage while not in use) and selectively detached from each other (e.g., providing for use of the lights in different areas or locations). Thus, for example, one of the lighting devices may be useful as a front light, and the other lighting device may be useful as a back or rear light. The base and/or the handle may be waterproof. In some examples, one of the lights may be configured to charge the power source(s) of the other light. Such configurations may be useful for examples in which one of the lights does not include a solar panel or an electronic connection such as a USB port or similar connection.

Each of the lighting devices of the set may include one or more light sources such as LEDs that generate the same color of light or different colors of light. For example, a first lighting device may generate white light (e.g., white LED(s)) suitable for use as a headlight), and the second lighting device may generate red or another color or light, similar to a brake light. The colored light may be generated from RGB LEDs, or may result from a color filter over white LEDs.

FIGS. 2A-2E illustrate an exemplary set 200 of lighting devices, which may include any of the features of lighting devices 100, 150 discussed above. The set 200 may include a first (or front) lighting device 202 and a second (or back) lighting device 204. The designations of "front" and "back" are for convenience only and non-limiting of the use of the lighting devices. For example, the front and back lighting devices 202, 204 may both be used at the front of a vehicle or device, or both used at the back of a vehicle or device, among other locations or positions relative to a vehicle or device. Similarly, the front lighting device 202 may be used at the rear of a vehicle or device (or other location), and the back lighting device 204 may be used at the front of a vehicle or device (or other location, different from the location of the front lighting device 202).

Figure 2B:
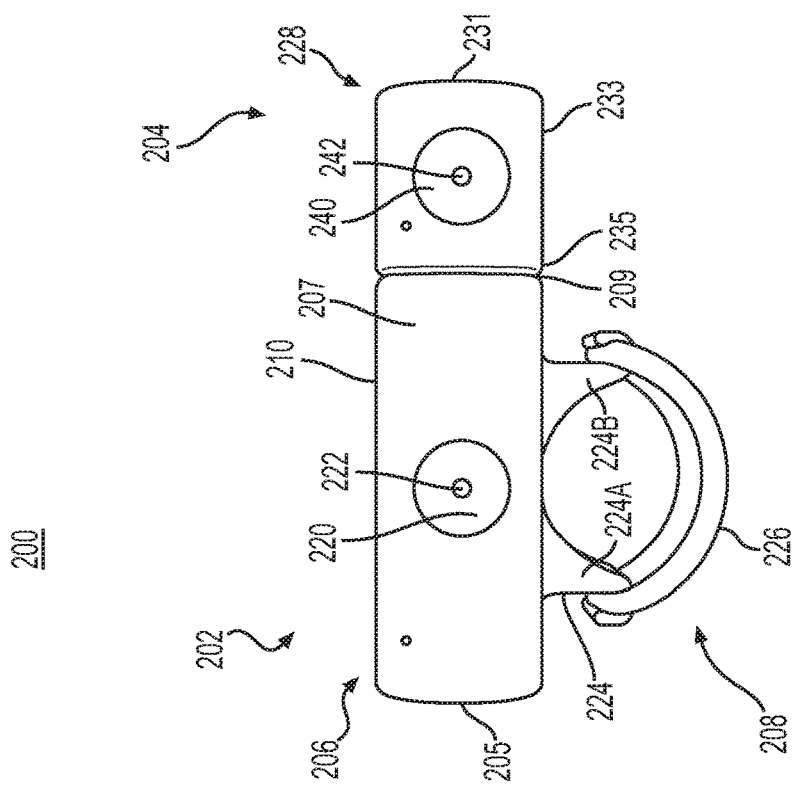
FIG. 2B shows a side view of the exemplary set of lighting devices of FIG. 2A.
Figure 2A:
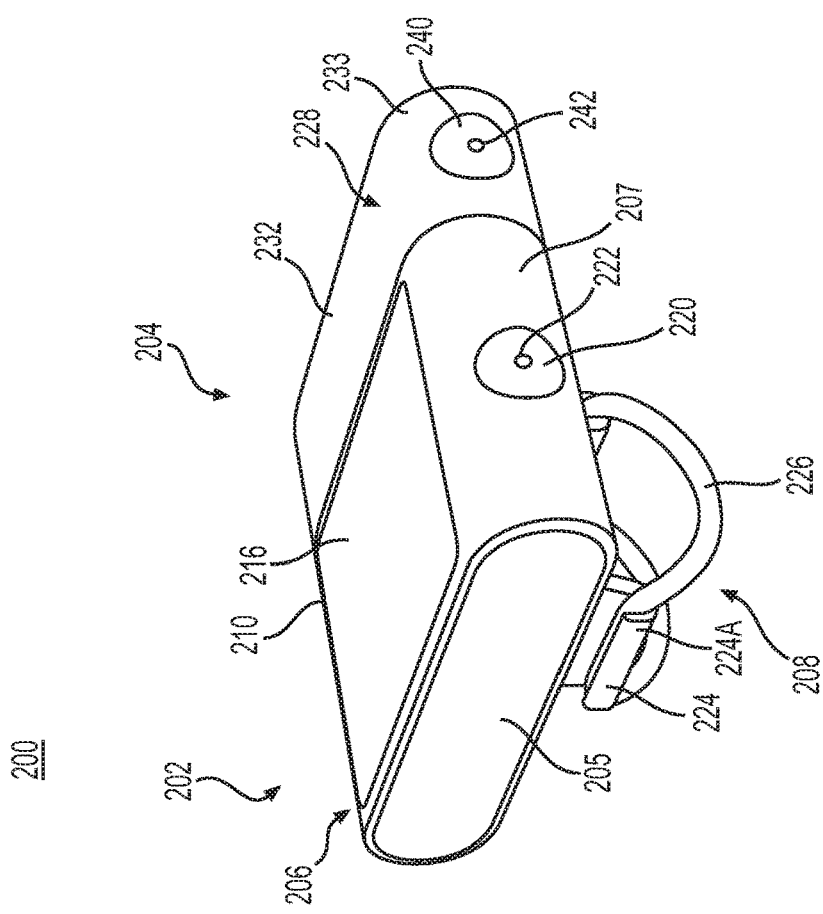
FIG. 2A shows a perspective view of an exemplary set of lighting devices, in accordance with some aspects of the present disclosure.
Figure 2E:
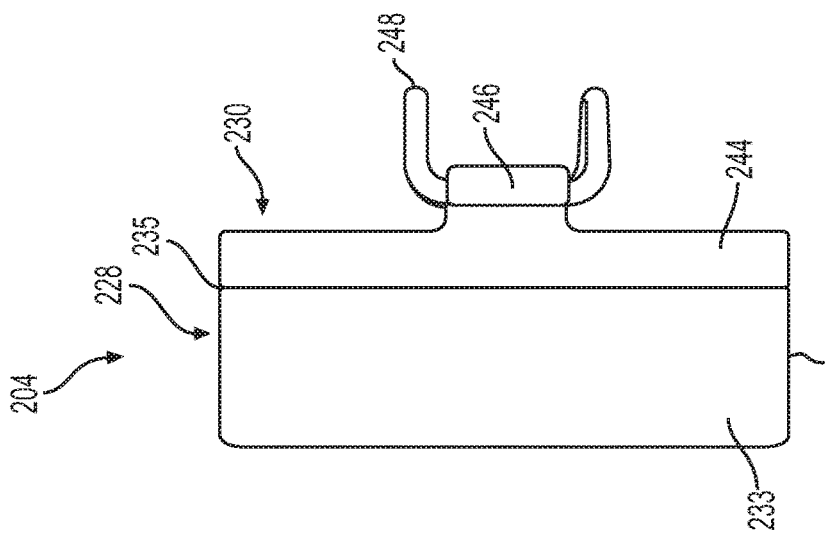
FIG. 2E shows a bottom view of the back lighting device of FIG. 2D.
Figure 2D:
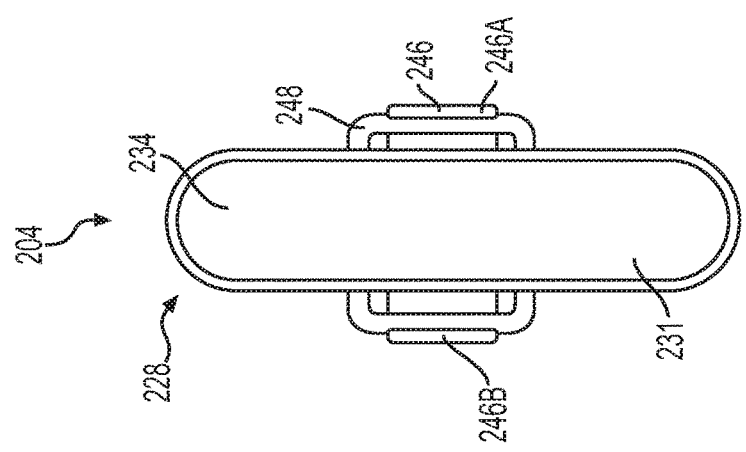
FIG. 2D shows a side view of a back lighting device of the exemplary set of lighting devices of FIG. 2A, including a back mount.
Figure 2C:
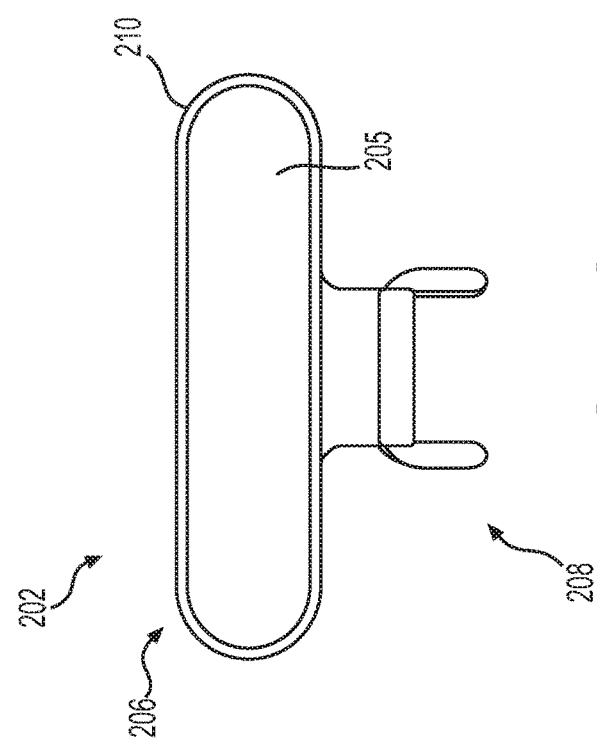
FIG. 2C shows a front view of a front lighting device of the exemplary set of lighting devices of FIG. 2A.

The front lighting device 202 may include a base 206 and a handle 208. The base 206 may include a housing 210, one or more light sources 212, one or more power sources 214, one or more circuit boards, one or more solar panels 216, and one or more magnets 218. The housing 210 may be a generally rectangular or square shape with rounded corners. As shown, for example, the housing 210 includes a front wall 205, four side walls 207, and a back wall 209. In at least one example, the front wall 205 and the back wall 209 may be planar and generally parallel to one another. The front wall 205 and the back wall 209 may be rectangular with rounded corners (as shown in FIGS. 2A and 2B) or may have any other suitable shape, including e.g., oval or other polygonal shapes (e.g., triangular, hexagonal, octagonal, etc.). The front wall 205 and the back wall 209 may have the same size, or may have different sizes. For example, the front wall 205 may be larger than the back wall 209, such that the housing 210 is tapered and wider towards the front wall 205, or the back wall 209 may be larger than the front wall 205, such that the housing 210 is tapered and wider towards the back wall 209. The side walls 207 may correspond to the shape of the front wall 205 and the back wall 209. For example, the housing 210 may include polygonal front and back walls 205, 209, and a plurality of side walls 207 corresponding in number to the number of sides of the polygon.

Exemplary materials suitable for the front wall 205, the side walls 207, and the back wall 209 include plastics, e.g., PVC, PE, TPU, ABS, and other suitable polymers. In some embodiments, at least a portion of the housing 210 may be transparent or translucent to allow light to pass therethrough. For example, the front wall 205 may comprise a clear or frosted plastic material (e.g., PVC, TPU, ABS, among other types of polymers). Optionally the front wall 205 may include a cover or a filter. Thus, for example, the front wall 205 may be configured to affect the quality, hue, intensity, and/or amount of light that passes therethrough.

The housing 210 may include a user element or interface configured to receive user input, such as a power button 220. Additionally or alternatively, the housing 210 may include one or more electronic ports, e.g., disposed on a side wall 207 or other suitable portion of the housing 210. The power button 220 may include a power indicator 222 to display the amount of power remaining in the lighting device 202, wherein the power indicator 222 may include any of the features of the power indicator 120 of lighting device 100.

The lighting device 202 may include any or all of the electronic components of the lighting device 100 discussed above. For example, the lighting device 202 may include a circuit board similar to the circuit board 112 of FIGS. 1A-1H, optionally in the form of a printed circuit board (PCB). Further, for example, the lighting device 202 may include a microprocessor configured to control the lighting device 202 in different operating modes, similar to the operating modes of lighting device 100.

The solar panel(s) 216 may be coupled to the outer surface of one or more of the side walls 207 (e.g., a top side wall 207, as shown in FIG. 2A). Any suitable solar panel may be used in the lighting device 202. The solar panel(s) 216 may include any of the features of the solar panel(s) 114 of the lighting device 100 discussed above. In some embodiments, the solar panel(s) 216 may be generally rectangular or square with rounded edges to conform to or accommodate the shape of the side wall(s) 207 to which the solar panel(s) 216 are coupled. The solar panel(s) 216, power source(s) 214, microprocessor, light source(s) 212, electronic port(s), and power button 220 may be in communication with one another, e.g., via a circuit board, for operating and controlling the lighting device 202. The power source(s) 214 may be operably connected to the solar panel(s) 216, the light source(s) 212, and one or more electronic port(s) (e.g., USB, USB-C, micro-USB, or other port-type connection that allows for transmission of power). Thus, the power source(s) 214 may be recharged from power generated by the solar panel(s) 216 and/or via power supplied by an external electronic device through the electronic port(s).

The first lighting device also may include one or more magnet(s) 218 (or magnetic components), which may be disposed proximate or adjacent to the back wall 209, e.g., to secure the attachment between the front lighting device 202 and the back lighting device 204. The magnet(s) 218 may be complementary to one or more magnets 238 or magnetic components of the back lighting device 204. The front lighting device 202 and the back lighting device 204 may, for example, be selectively attached to each other (e.g., for charging and/or storage while not in use) and selectively detached from each other (e.g., providing for use of the lights in different areas or locations). While this example uses magnetic components, it is understood that other mating features may be used, such as clips, threads, friction fit, etc.

The front lighting device 202 may include features for securing the device 202 to a support, such as a vehicle frame. For example, the front lighting device 202 may include a mount. In at least one example, the mount 224 is configured as part of a handle 208 coupled to a side wall 207 of the housing 210. For example, as shown in FIGS. 2A and 2B, the handle 208 may be coupled to a side wall opposite the side wall 207 to which the solar panel(s) 216 are attached. The handle 208 may be integral with the housing 210 of the front lighting device 202 or may be a separate component detachable from the housing 210. The mount 224 may be rigid or semi-rigid. For example, the mount 224 may comprise a hard plastic.

According to some aspects of the present disclosure, the handle 208 includes one or more straps 226 coupled to the mount 224. The mount 224 may include a left portion 224A and a right portion 224B for securing the strap(s) 226. The left portion 224A and the right portion 224B may each include a hook-shaped structure for securing the strap(s) 226. The mount 224 may have a generally half circular shape in order to be wrapped around a support, e.g., vehicle frame or other portion of a device to which the lighting device 202 is to be attached. The mount 224 may comprise or be formed of a rigid material, such as hard/rigid ABS. In some embodiments, the mount 224 may comprise a rigid material or materials covered with a flexible material or materials (e.g., silicone or rubber). The strap(s) 226 may comprise or be formed of a flexible material, including, but not limited to, flexible and elastic polymers such as silicone or rubber. The flexibility of the strap(s) 226 may allow for wrapping around support frames of various types of vehicles or sizes of vehicles. The strap(s) 226 may wrap around the left portion 224A and a right portion 224B of the mount 223 in order to secure the front lighting device 202 to a support. For example, a user may place the mount 224 around a support, then wrap the strap 226 around the left portion 224A of the front handle 208, and later wrap the strap 226 around the right portion 224B to secure the front lighting device 202 to the support. Since the strap(s) 226 may be flexible and/or elastic, the front lighting device 202 may be secured to different supports with different sizes. Also, a user may remove the handle 208 from the support by separating the strap(s) 226 from the mount 224.

In at least one example, the front lighting device 202 includes a mount 224 configured to be attached to a support without straps. For example, the shape of the mount 224 may provide for a friction-fit around a support. In at least one example, the mount 224 may be at least partially flexible to conform to different shapes and/or sizes of supports. The mount 224 optionally may be used with adapters of different sizes to accommodate different types of supports (e.g., different types of vehicles and/or sizes of vehicle frames). Further, in at least one example, the front lighting device 202 does not include a mount.

As shown in FIG. 2A, the solar panel(s) 216 and the light source(s) 212 may be on different surfaces of the base 206 of the lighting device 202. For example, the solar panel(s) 216 and the light source(s) 212 (e.g., LED(s)) may be disposed on surfaces that are generally perpendicular to each other. The power source(s) 214 (e.g., a rechargeable battery) may be operably connected to the solar panel(s) 216, the light source(s) 212, and optionally one or more electronic ports (USB, USB-C, micro-USB, or other port-type connection), similar to electronic port(s) 119 of the lighting device 100 discussed above.

Referring now to the back lighting device 204 shown in FIGS. 2A and 2B, the back lighting device also may include a base 228 comprising a housing 232, one or more light sources 234, one or more power sources 236, a circuit board, optionally one or more solar panels, and one or more magnets or magnetic components 238. In some examples herein, the back lighting device 204 does not include a solar panel.

Similar to the housing 210 of the front lighting device 202, the housing 232 of the back lighting device 204 may have a generally rectangular or square shape with rounded corners. The housing 232 may include a front wall 231, four side walls 233, and a back wall 235. The front wall 231 and the back wall 235 each may be planar and parallel to each other. Similar to housing 210 above, other shapes and sizes are contemplated and encompassed herein. The front wall 231 may be at least partially transparent or translucent to allow light to pass therethrough. That is, the light source(s) 234 may face towards the inner surface of the front wall 231, and at least a portion of the light generated by the light source(s) 234 may pass through the front wall 231.

Figure 2F:
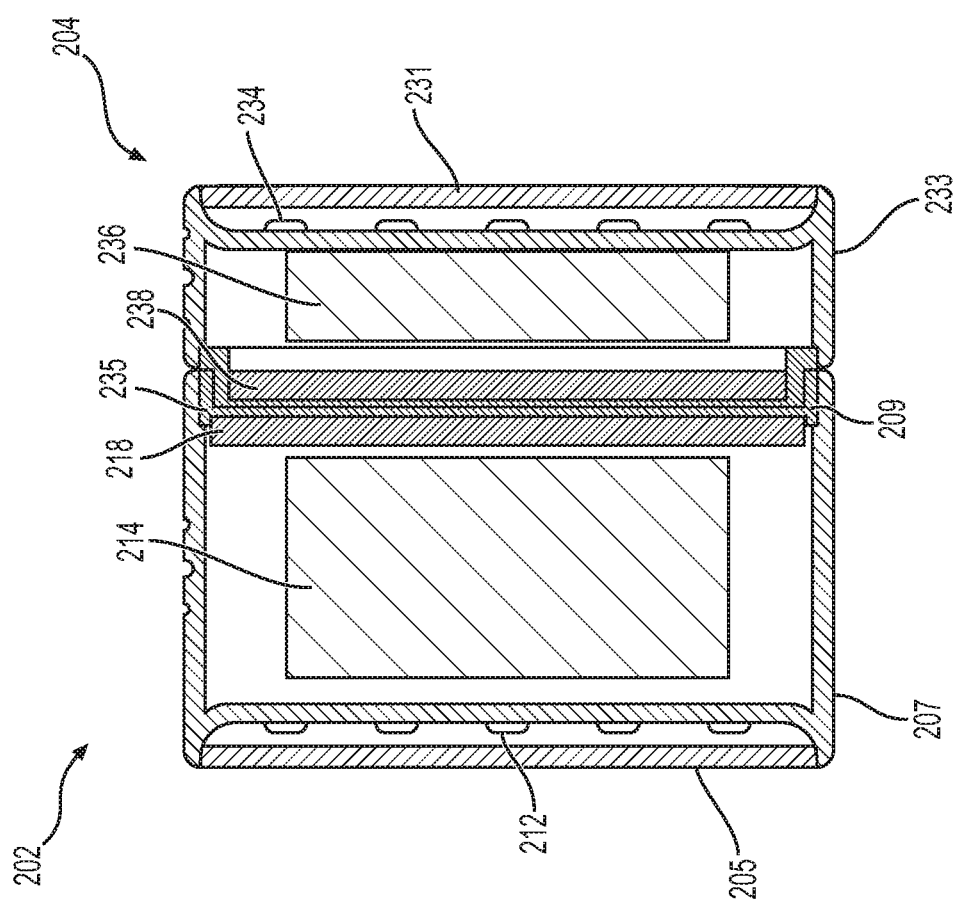
FIG. 2F shows a cross-section view of the exemplary set of lighting devices of FIG. 2A.

As mentioned above, the front lighting device 202 and the back lighting device 204 may be configured to attach together, e.g., to facilitate storage and/or to allow for power to transfer between the devices 202, 204. In some examples, as mentioned above, the front and back lighting devices 202, 204 comprise complementary magnets or magnetic components. As shown in FIG. 2F, the front lighting device 202 includes at least one magnet 218 at or proximate the back wall 209 of the front lighting device 202, and the back lighting device 204 includes at least one magnet 238 at or proximate the back wall 235 of the back lighting device 204. The back wall 235 of the back (or second) lighting device 204 may have the same design, size, and/or shape as the back wall 209 of the front (or first) lighting device 202 so the lighting devices 202, 204 may be secured together via magnetic attraction when the respective back walls 209, 235 come in contact with each other. In other embodiments, the back walls 209, 235 may have different designs, sizes, and/or shapes, wherein another or additional securing mechanism (e.g., external clips or other mating features) may be used to secure the lighting devices 202, 204 together.

The housing 232 of the back lighting device 204 may include any features or components of the housing 210 of the front lighting device 202, such as a power button 240 (similar to power button 220), a power indicator 242 (similar to power indicator 222), and/or one or more electronic ports. Further, the housing 232 may contain one or more light sources 234, similar to the light source(s) 212 of the front lighting device 202.

In at least one example, the back lighting device 204 may be configured to attach to a mount 230, which may serve a similar function as the mount 224 discussed above. The mount 230 may be used to secure the set 200 of lighting devices to a support in place of the mount 224 discussed above. For example, the mount may be used to secure the back lighting device 204 to a support, such as a vehicle frame or other device.

The mount 230 may be configured to attach to a portion of the housing 232 opposite or adjacent to the surface from which light is emitted. In at least one example, the mount 230 may be coupled to the back wall 235 opposite the front wall 231 through which light generated by the light source(s) 234 may pass, as discussed above. Additionally or alternatively, a portion of the mount 230 may be coupled to a side wall 233, e.g., the mount 230 providing a flat surface for a side wall 233 to rest on. The mount 230 optionally may include one or more straps, which may be flexible, e.g., comprising silicone or other flexible material, to facilitate securing of the mount 230 (and back lighting device and/or front lighting device 204) to a vehicle frame or other support. The straps of the mount 230 may be similar to and/or include any features of, the straps 226 discussed above. The straps of the mount 230 may be configured to secure the back lighting device 204 to a support parallel or transverse (e.g., perpendicular) to the back wall 235.

The mount 230 may include one or more magnets complementary to the magnets 238 proximate the back wall 235 of the back lighting device 204. Thus, for example, the mount 230 may be attached to, and detached from, the back lighting device, via magnetic attraction of the respective magnets. The magnetic attraction may be sufficiently strong to hold the back lighting device 204 and/or the set 200 of lighting devices in place, e.g., secured to a vehicle during travel.

According to some aspects of the present disclosure, the mount 230 includes a base 244 that includes an extension 246, and one or more straps 248 coupled to the extension. Thus, for example, the base 244 may include the magnet(s) 238 complementary to the magnets 218 of the front lighting device 202. The extension 246 of the mount 230 may include a left portion 246A and a right portion 246B for securing the strap(s) 248. The left portion 246A and the right portion 246B may each include a hook-shaped structure for securing the strap(s) 248. The extension 246 may have a generally half circular shape in order to be wrapped around a support (e.g., vehicle frame). The mount 230 may comprise or be formed of a rigid material, such as hard/rigid ABS. In some embodiments, one or more components of the mount 230, e.g., the base 244 and/or the extension 246 may comprise a rigid polymer covered with a more flexible polymer or other material(s) (e.g., silicone or rubber). The extension 246 of the mount 230 may include any of the features of the mount 224 of the front lighting device 202 discussed above, and/or the strap(s) 248 may include any of the features of the strap(s) 226 of the front lighting device 202 discussed above.

In some embodiments, the set 200 of lighting devices may include a front lighting device 202, a back lighting device 204, and one or more mounts configured to secure the first and/or second lighting device to a support. For example, the set 200 may include a first mount 224 coupled to or integrated with the housing of the front lighting device 202, and/or a second mount 230 configured to releasably attach to the back lighting device 204. Thus, for example, the front lighting device 202, the back lighting device 204, and the second mount may be configured to be selectively coupled to, and detached from, one another via complementary mating elements, e.g., magnets or other suitable mating elements. For example, the back lighting device 204 may be configured for attachment to the front lighting device 202 via respective magnets 218, 238. The back lighting device 204 may be coupled to the front lighting device 202 for securing purposes and/or for charging the power source(s) 236 of the back lighting device 204 (e.g., via power generated by the solar panel(s) 216 and stored in the power source(s) 214 of the front lighting device 202).

While the present disclosure has described certain examples of lighting devices and sets of lighting devices, it is understood that each lighting device may be provided individually. Depending on its material, the lighting devices may be chemically resistant to a wide range of liquids, including acid or alkaline, or exposure to other environmental conditions. The lighting devices herein may also be UV resistant and/or pressure resistant. For example, the lighting devices may withstand at least 10 lbs, 50 lbs, 100 lbs, 150 lbs, 200 lbs or more pressure or weight. In some embodiments, the lighting device may withstand between 10 lbs and 200 lbs, 50 lbs to 300 lbs, or 50 lbs and 200 lbs of pressure or weight. The lighting devices may be water proof or water resistant, being IPX4, IPX5, IPX6, IPX7, or IPX8.

The lighting devices according to the present disclosure may be configured to provide for a flashlight or spotlight effect. Any of the devices disclosed herein may be configured to operate according to at least one protocol or operating mode. Further, any features disclosed herein in connection with one embodiment may be combined with any other embodiments. Other embodiments of the present disclosure will be apparent to those skilled in the art from consideration of the specification and practice of the embodiments disclosed herein. It is intended that the specification and examples be considered as exemplary only, with a true scope and spirit of the disclosure indicated by the following claims.

We claim:

1. A lighting device, comprising:
   a housing including a front wall, a back wall, and at least one side wall between the front wall and the back wall;
   at least one light source facing towards the front wall;
   a rechargeable battery in electronic communication with the light source;
   at least one solar panel coupled to the at least one side wall of the housing; the solar panel being in electronic communication with the light source and the rechargeable battery;
   a magnet extending along an entire width of the housing and coupled to or proximate the back wall for attaching the housing to an outermost wall of a second lighting device, the back wall being planar and configured to abut the outermost wall of the second lighting device; and
   a mount coupled to or integrated into the housing, the mount being configured to secure the lighting device to a support with a flexible strap, wherein the mount includes a first hook and a second hook for securing the strap therebetween, wherein when the mount is coupled to the housing, the first hook faces in a direction towards the front wall and the second hook faces in a direction towards the back wall;
   wherein the lighting device is configured to transfer power from the rechargeable battery to the second lighting device when the second lighting device is attached to the housing along the back wall via the magnet.

2. The lighting device of claim 1, wherein the mount further comprises the strap, a first end of the strap coupled to the first hook and a second end of the strap coupled to the second hook.

3. The lighting device of claim 1, wherein the housing includes a plurality of side walls, and the mount is coupled to or integrated into a side wall different than the side wall to which the solar panel is coupled.

4. The lighting device of claim 3, wherein the housing includes four side walls, and the solar panel is coupled to a side wall opposite the side wall coupled to or integrated with the mount.

5. A set of lighting devices comprising the lighting device of claim 1, wherein the lighting device is a first lighting device, the set of lighting devices further comprising:
   the second lighting device including:
      a housing including a front wall, a back wall, and at least one side wall between the front wall and the back wall;
      at least one light source facing towards the front wall;
      a rechargeable battery in electronic communication with the light source; and
      at least one magnet coupled to or proximate the back wall;
   wherein the back wall of the second lighting device is the outermost wall configured to abut the back wall of the first lighting device; and wherein the magnet of the first lighting device is complementary to the magnet of the second lighting device, such that the back wall of the first lighting device is releasably attachable to the back wall of the second lighting device by magnetic attraction.

6. The set of lighting devices of claim 5, wherein the second lighting device does not include a solar panel.

7. The set of lighting devices of claim 5, wherein the first lighting device is configured to charge the rechargeable battery of the second lighting device when the first and second lighting devices are coupled together.

8. The set of lighting devices of claim 5, wherein the mount of the first lighting device is a first mount, the set of lighting devices further comprising a second mount that includes at least one magnet, the second mount being releasably attachable to the back wall of the second lighting device by magnetic attraction; and wherein the second mount includes an extension and a flexible strap for securing the second lighting device to a support, the second mount having a width greater than a width of the second lighting device.

* * * * *